US009569151B2

(12) United States Patent
Sakurai

(10) Patent No.: US 9,569,151 B2
(45) Date of Patent: Feb. 14, 2017

(54) TERMINAL DEVICES THAT PROCESS IMAGE DATA IN DIFFERENT SYSTEMS BASED ON WIRELESS COMMUNICATION SETTING, METHODS OF CONTROLLING SUCH TERMINAL DEVICES, AND MEDIA STORING COMPUTER-READABLE INSTRUCTIONS FOR SUCH TERMINAL DEVICES

(75) Inventor: Kunihiko Sakurai, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 102 days.

(21) Appl. No.: 13/416,628

(22) Filed: Mar. 9, 2012

(65) Prior Publication Data

US 2012/0243041 A1 Sep. 27, 2012

(30) Foreign Application Priority Data

Mar. 22, 2011 (JP) ................................ 2011-062422

(51) Int. Cl.
*G06F 3/12* (2006.01)
*H04M 1/725* (2006.01)

(52) U.S. Cl.
CPC ........... *G06F 3/1236* (2013.01); *G06F 3/1208* (2013.01); *G06F 3/1268* (2013.01); *G06F 3/1292* (2013.01);
(Continued)

(58) Field of Classification Search
CPC .... G06F 3/1208; G06F 3/1236; G06F 3/1268; G06F 3/1256; G06F 3/1292; H04M 1/72519; H04M 1/72561; H04M 1/7253
(Continued)

(56) References Cited

U.S. PATENT DOCUMENTS

2003/0023725 A1\* 1/2003 Bradfield ............ G06F 21/6218
709/225
2003/0154383 A9\* 8/2003 Wiley ................... G06F 21/608
713/189

(Continued)

FOREIGN PATENT DOCUMENTS

JP 2001-188736 A 7/2001
JP 2001188736 A \* 7/2001
(Continued)

OTHER PUBLICATIONS

Japan Patent Office, Notice of Reasons for Rejection for Japanese Patent Application No. 2011-062422 (counterpart to above-captioned patent application), mailed Jun. 18, 2013.

*Primary Examiner* — Tammy Paige Goddard
*Assistant Examiner* — Edwin S Leland, III
(74) *Attorney, Agent, or Firm* — Baker Botts L.L.P.

(57) ABSTRACT

Non-transitory, computer-readable storage media, terminal devices, and methods are disclosed herein. The terminal device includes a processor and communicates selectively using one of many wireless communication systems comprising a first and second wireless communication system. The computer-readable media store computer-readable instructions therein. The instructions instruct the processor to generate first specific image data representing a first image when the first wireless communication system is specified. The instructions instruct the processor to store the first specific image data when the terminal device receives a first print instruction to print the first image while the first wireless communication system is specified. The instructions instruct the processor to provide first print data, based on the stored first specific image data, to the printing device when the wireless communication setting is changed from the first wireless communication system to the second (Continued)

wireless communication system after storing the first specific image data.

16 Claims, 3 Drawing Sheets

(52) U.S. Cl.
CPC ........ *H04M 1/72561* (2013.01); *G06F 3/1256* (2013.01); *H04M 1/7253* (2013.01)

(58) Field of Classification Search
USPC .............. 358/1.15; 455/552.1, 566; 709/225
See application file for complete search history.

(56) References Cited

U.S. PATENT DOCUMENTS

| | | | | |
|---|---|---|---|---|
| 2004/0184073 A1* | 9/2004 | Shahindoust | ..... | H04L 29/08846 358/1.15 |
| 2004/0184100 A1* | 9/2004 | Shahindoust | ..... | H04L 29/08846 358/1.15 |
| 2004/0185877 A1* | 9/2004 | Asthana | ................ | G06Q 30/02 455/456.6 |
| 2004/0253990 A1* | 12/2004 | McCoog | ............ | H04N 1/00185 455/566 |
| 2005/0203772 A1* | 9/2005 | Funahashi | .............. | G06Q 10/02 705/2 |
| 2008/0320296 A1* | 12/2008 | Walker | ................. | G06F 3/1222 713/150 |
| 2009/0066998 A1* | 3/2009 | Kato | ...................... | G01C 21/26 358/1.15 |
| 2010/0020972 A1* | 1/2010 | Baugher | .............. | G06F 21/606 380/255 |
| 2010/0029326 A1* | 2/2010 | Bergstrom | .............. | G11B 27/11 455/556.1 |
| 2010/0156812 A1* | 6/2010 | Stallings | ............. | G06F 3/04883 345/173 |
| 2010/0267337 A1* | 10/2010 | Wu | ........................ | G06F 3/1204 455/41.3 |
| 2011/0026069 A1* | 2/2011 | Jesudason | ............. | G06F 3/1204 358/1.15 |
| 2011/0051173 A1* | 3/2011 | Yagishita | .............. | G06F 3/1222 358/1.14 |
| 2011/0075200 A1* | 3/2011 | Goldwater | ............ | G06F 3/1205 358/1.15 |
| 2012/0021801 A1* | 1/2012 | Miyata | .................... | H04W 4/00 455/552.1 |
| 2012/0026538 A1* | 2/2012 | Miyata | .................... | H04L 67/04 358/1.15 |
| 2012/0030690 A1* | 2/2012 | Kakitsuba | ............. | G06F 3/1204 719/327 |
| 2012/0099566 A1* | 4/2012 | Laine | .................. | H04M 1/7253 370/338 |
| 2012/0196604 A1* | 8/2012 | Ohmoto | ................ | H04W 48/18 455/437 |
| 2012/0206751 A1* | 8/2012 | Bradshaw | ............ | G06F 3/1208 358/1.13 |

FOREIGN PATENT DOCUMENTS

| | | | |
|---|---|---|---|
| JP | 2004-334837 A | | 11/2004 |
| JP | 2005-012796 A | | 1/2005 |
| JP | 2007055124 A | * | 3/2007 |
| JP | 2008-187417 A | | 8/2008 |
| JP | 2008187417 A | * | 8/2008 |
| JP | 2009-061606 A | | 3/2009 |
| JP | 2012-029148 A | | 2/2012 |
| JP | 2012-034100 A | | 2/2012 |

* cited by examiner

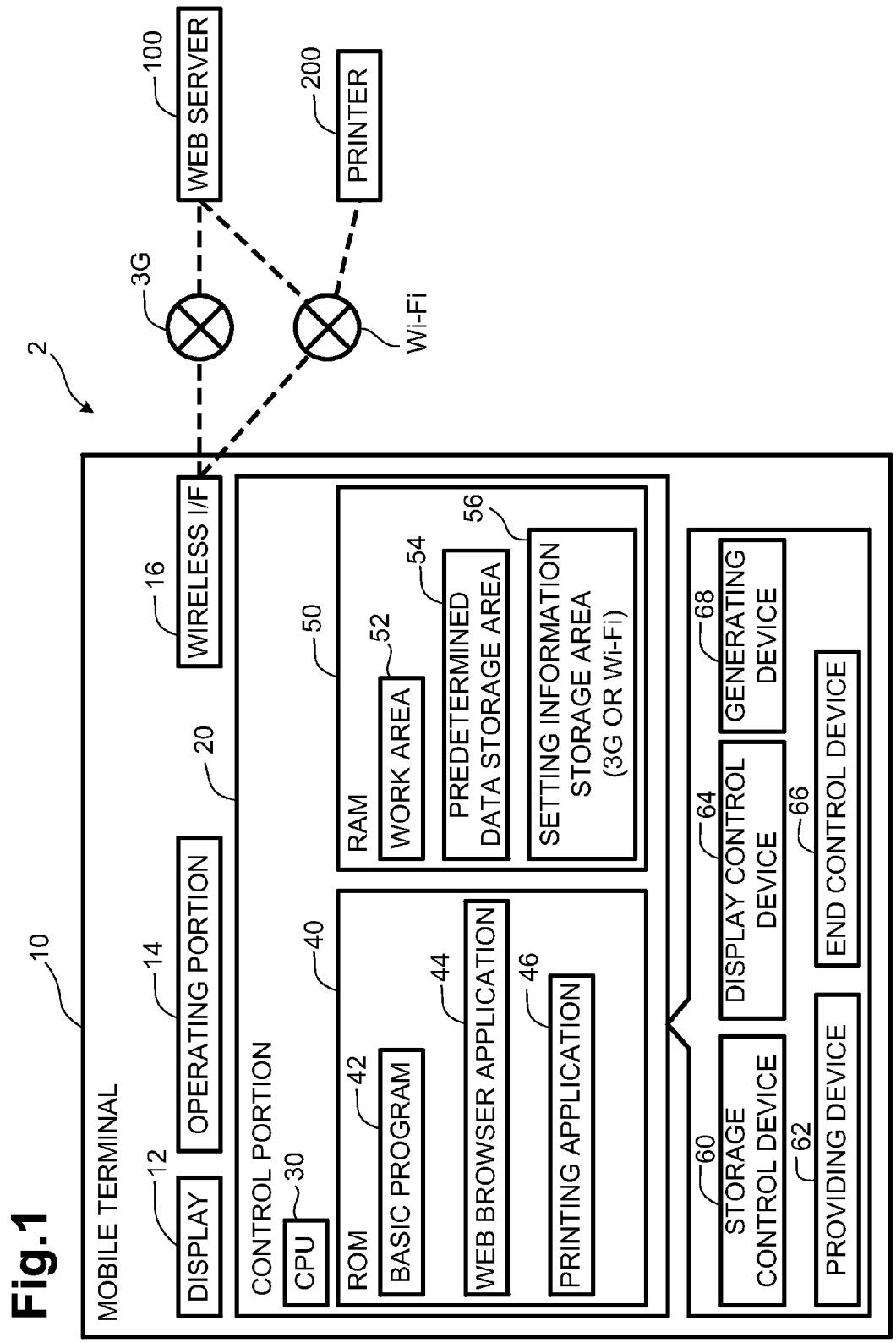

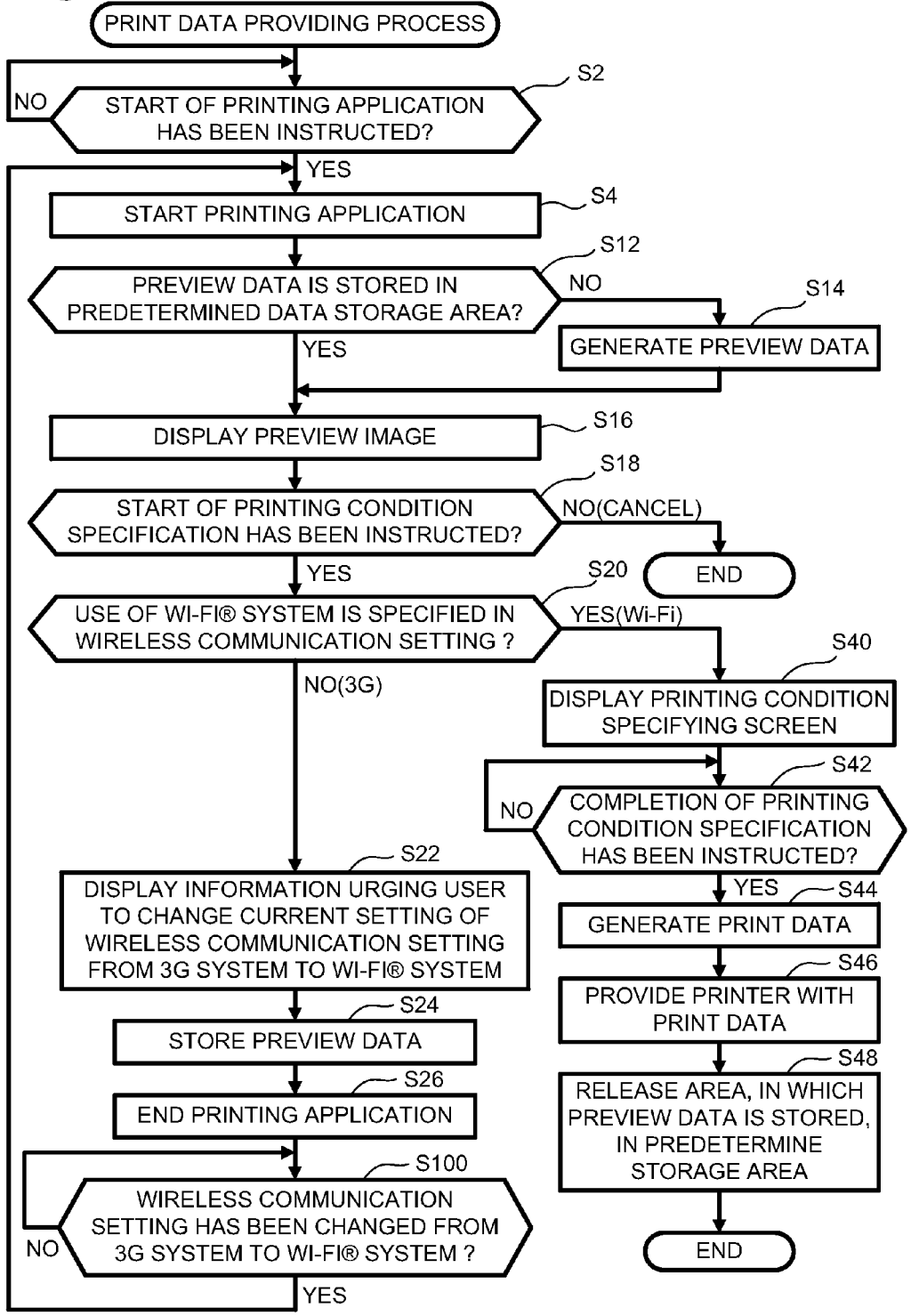

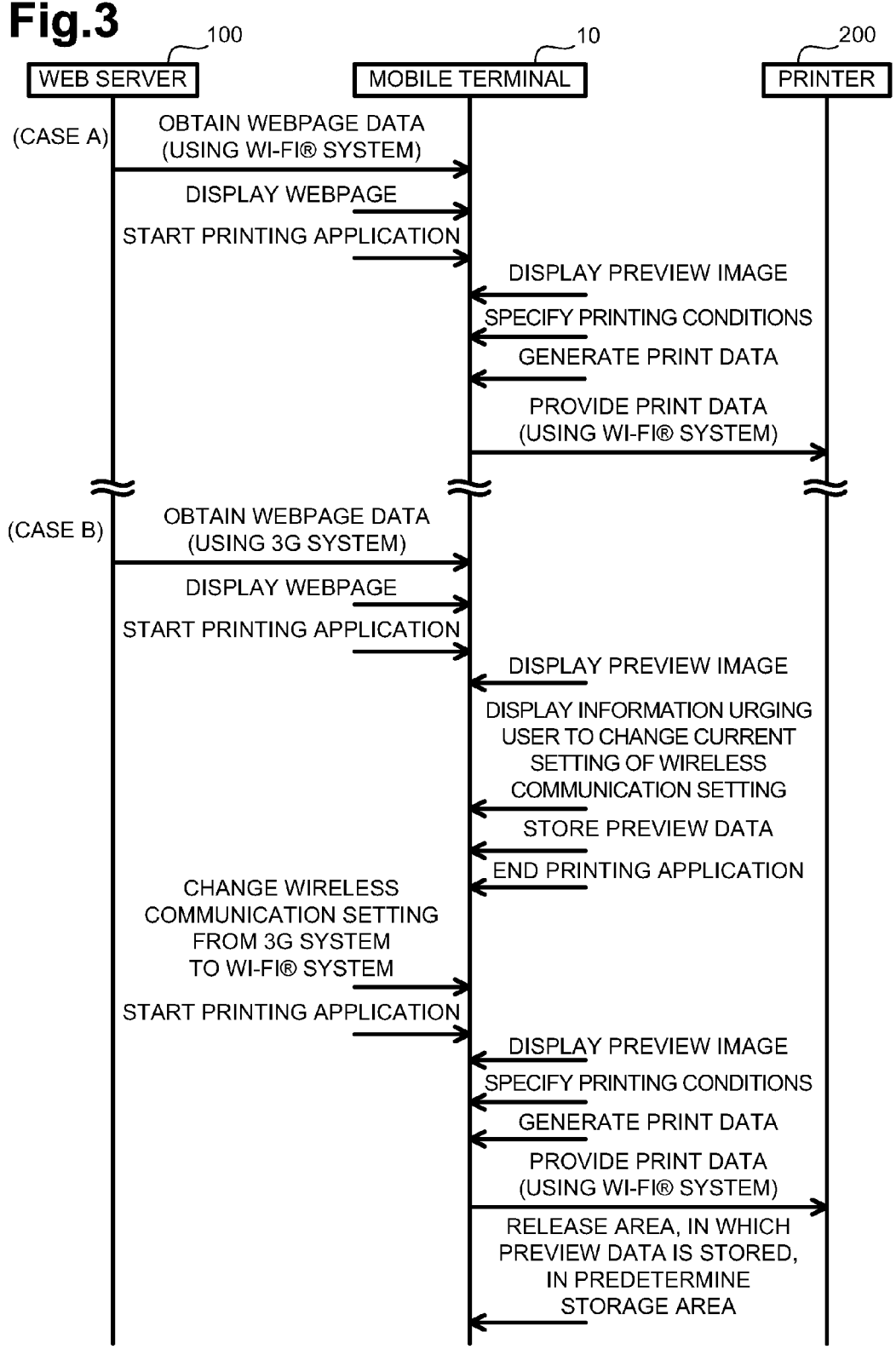

TERMINAL DEVICES THAT PROCESS IMAGE DATA IN DIFFERENT SYSTEMS BASED ON WIRELESS COMMUNICATION SETTING, METHODS OF CONTROLLING SUCH TERMINAL DEVICES, AND MEDIA STORING COMPUTER-READABLE INSTRUCTIONS FOR SUCH TERMINAL DEVICES

CROSS-REFERENCE TO RELATED APPLICATION

The present application claims priority from Japanese Patent Application No. 2011-062422, filed on Mar. 22, 2011, which is incorporated herein by reference.

BACKGROUND OF THE INVENTION

1. Field of the Invention

The invention relates to terminal devices that communicate by selectively using one of a plurality of wireless communication systems, computer-readable media comprising computer-readable instructions for controlling such terminal devices, and systems comprising such terminal devices and printing devices.

2. Description of Related Art

A known terminal device communicates with another device selectively using one of a plurality of communication systems. In particular, the known terminal device provides print data to a printing device selectively using one of the plurality of communication systems that is compatible with a communication system of the printing device.

SUMMARY OF THE INVENTION

A problem arises when a user desires a preview of an image to be printed before sending the print data to the printing device. When the terminal device obtains specific data from the other device using a communication system, which is specified in the terminal device, the terminal device may display a specific image represented by the specific data on a display. A user may provide the terminal device with an instruction for the printing device to print the specific image while the display displays the specific image. The known terminal device does not provide a means for the user to provide the terminal device with an instruction for the printing device to print the specific image while the display displays the specific image. Further, the known terminal device does not provide a means for retaining the specific image on the display when the user changes a communication system setting of the terminal device after obtaining the specific data and before sending print data to the printing device. When the terminal device communicates with the other device and the printing device using different communication systems, this may prevent the user from previewing and confirming the image to be printed before printing. Embodiments disclosed herein may provide for a technique that provides a user with a desired print result under the circumstances described above.

A non-transitory, computer-readable storage medium disclosed herein may store a computer program comprising computer-readable instructions therein. The computer-readable instructions may be executable by a processor of a terminal device configured to perform communication by selectively using one of a plurality of wireless communication systems comprising a first wireless communication system and a second wireless communication system. The computer-readable instructions may instruct the processor to execute a function of generating first specific image data representing a first image when the first wireless communication system is specified in a wireless communication setting of the terminal device. The computer-readable instructions may instruct the processor to execute a function of storing the first specific image data when the terminal device receives a first print instruction for a printing device to print the first image while the first wireless communication system is specified in the wireless communication setting of the terminal device. The computer-readable instructions may instruct the processor to execute a function of providing first print data, based on the stored first specific image data, to the printing device when the wireless communication setting of the terminal device is changed from the first wireless communication system to the second wireless communication system after storing the first specific image data.

A terminal device disclosed herein may be configured to communicate by selectively using one of a plurality of wireless communication systems comprising a first wireless communication system and a second wireless communication system. The terminal device may comprise a processor and a memory. The memory may be configured to store computer-readable instructions therein. The computer-readable instructions may instruct the processor to perform a function of generating first specific image data representing a first image when the first wireless communication system is specified in a wireless communication setting of the terminal device. The computer-readable instructions may instruct the processor to perform a function of storing the first specific image data when the terminal device receives a first print instruction for a printing device to print the first image while the first wireless communication system is specified in the wireless communication setting of the terminal device. The computer-readable instructions may instruct the processor to perform a function of providing first print data, based on the stored first specific image data, to the printing device when the wireless communication setting of the terminal device is changed from the first wireless communication system to the second wireless communication system after storing the first specific image data.

A method of controlling a terminal device disclosed herein may comprise certain steps for controlling the terminal device. The terminal device may perform communication by selectively using one of a plurality of wireless communication systems comprising a first wireless communication system and a second wireless communication system. The method may comprise a step of generating first specific image data representing a first image when the first wireless communication system is specified in a wireless communication setting of the terminal device. The method may comprise a step of storing the first specific image data when the terminal device receives a first print instruction for a printing device to print the first image while the first wireless communication system is specified in the wireless communication setting of the terminal device. The method may comprise a step of providing first print data, based on the stored first specific image data, to the printing device when the wireless communication setting of the terminal device is changed from the first wireless communication system to the second wireless communication system after storing the first specific image data.

According to the invention, above-described configurations may correspond to a terminal device that receives a first print instruction for a printing device to print a first image while a first wireless communication system is specified in the wireless communication setting of the terminal device and while a display on the terminal device displays the first image, wherein the first image is represented by first specific data obtained from another device using the first wireless communication system. Under these circumstances, the terminal device may store the specific image data representing the first image in a predetermined storage area. Therefore, after the terminal device changes the wireless communication setting from the first wireless communication system to a second wireless communication system, which is compatible with the printing device, the terminal device may provide first print data, which the terminal device may obtain based on the specific image data stored in the predetermined storage area, to the printing device without re-obtaining the first specific data from the other device using the second wireless communication system. Thus, the printing device may print the first image onto a printing medium. Accordingly, the user may obtain a desired print result.

Terminal devices, non-transitory, computer-readable media for controlling terminal devices, and methods of controlling terminal devices, as well as other embodiments of the invention, are disclosed herein.

Other objects, features, and advantages will be apparent to persons of ordinary skill in the art from the following detailed description of embodiments of the invention and the accompanying drawings.

BRIEF DESCRIPTION OF THE DRAWINGS

For a more complete understanding of the present invention, needs satisfied thereby, and the objects, features, and advantages thereof, reference now is made to the following descriptions taken in connection with the accompanying drawings.

FIG. 1 is a block diagram depicting a configuration of a network system in an embodiment according to one or more aspects of the invention.

FIG. 2 is a flowchart of a print data providing process in the embodiment according to one or more aspects of the invention.

FIG. 3 is a sequence diagram depicting operations performed by each device in the embodiment according to one or more aspects of the invention.

DETAILED DESCRIPTION OF EMBODIMENTS OF THE INVENTION

Embodiments of the invention now are described in detail with reference to the accompanying drawings. As depicted in FIG. 1, a network system 2 may comprise a mobile terminal 10, (e.g., a terminal device) a web server 100, and a printer 200 (e.g., a printing device). The mobile terminal 10 may be, for example, one or more of a mobile phone and a personal digital assistant ("PDA"). The mobile terminal 10 may be configured to communicate with the web server 100 using a third generation ("3G") mobile telecommunications system (hereinafter, also referred to as "3G system") (e.g., a first wireless communication system) and to communicate with one or more of the web server 100 and the printer 200 using a Wireless Fidelity ("Wi-Fi®") system (Wi-Fi® is a registered certification mark owned by the Wi-Fi Alliance of Austin, Tex.) (e.g., a second wireless communication system). The mobile terminal 10 may be configured to use selectively one or more of a plurality of wireless communication systems. The plurality of wireless communication systems may comprise the 3G system and the Wi-Fi® system. For example, when a wireless communication setting of the mobile terminal 10 specifies the 3G system, the mobile terminal 10 may communicate with another device (e.g., the web server 100) using the 3G system. When the wireless communication setting of the mobile terminal 10 specifies the Wi-Fi® system, the mobile terminal 10 may communicate with the other device (e.g., the web server 100) or yet another device (e.g., the printer 200) using the Wi-Fi® system.

The 3G system may be a wireless communication system that complies with the International Mobile Telecommunication 2000 ("IMT-2000") standard defined by the International Telecommunication Union. The Wi-Fi® system may be a wireless communication system that complies with standards defined by the Wi-Fi Alliance.

The printer 200 may be configured to communicate using the Wi-Fi® system, but the printer 200 may not be configured to communicate using the 3G system.

The mobile terminal 10 may comprise a display 12, an operating portion 14, a wireless interface ("I/F") 16, and a control portion 20. The display 12 may be configured to display, for example, information specified by the control portion 20. A user may operate the mobile terminal 10 through the operating portion 14.

The control portion 20 may comprise a central processing unit ("CPU") 30, a read-only memory ("ROM") 40, and a random-access memory ("RAM") 50. The CPU 30 may be configured to perform one or more processes in accordance with a basic program 42 stored in the ROM 40. The one or more processes may comprise, for example, one or more of a voice data communication process and an electronic mail ("e-mail") communication process. The CPU 30 may be configured to obtain webpage data (e.g., one or more of first specific data and second specific data) from the web server 100 in accordance with a web browser application program 44 stored in the ROM 40. The CPU 30 may be configured to perform one or more processes in accordance with a printing application program 46 (e.g., a specific application program) stored in the ROM 40. For example, the printing application program 46 may instruct the CPU 30 to function as one or more of a storage control device 60, a providing device 62, a display control device 64, an end control device 66, and a generating device 68.

The ROM 40 may store one or more of the basic program 42, the web browser application program 44, and the printing application program 46, which may be preinstalled on the mobile terminal 10 before one or more of sale, shipment, and delivery. Alternatively or additionally, the mobile terminal 10 may obtain the printing application program 46 from still another device (e.g., a predetermined web server); and the mobile terminal 10 may install obtained the printing application program 46 thereon and store obtained the printing application program 46 in nonvolatile memory (e.g., a nonvolatile RAM or a hard disk drive ("HDD")), which may be a storage area different from the ROM 40 or the RAM 50.

The RAM 50 may comprise a work area 52, a predetermined data storage area 54 (e.g., a predetermined memory area), and a setting information storage area 56. The work area 52 may be configured to store temporarily, for example, data that may be generated when the CPU 30 performs one or more of a process in accordance with the basic program 42 and other processes. After the one or more process finishes using the work area 52 (e.g., the one or more processes terminate), the CPU 30 may release the work area 52, and the work area 52 may become available to be overwritten with new data or the CPU 30 may erase the data from the work area 52, which was generated and stored during the one or more processes.

For example, the CPU 30 may be configured to store webpage data obtained from the web server 100 in the work area 52, in accordance with the web browser application program 44. The CPU 30 may be configured to display on the display 12 a webpage represented by the webpage data stored in the work area 52. After the web browser application program 44 finishes using the work area 52, the CPU 30 may release the portion of the work area 52 that stores the webpage data.

The predetermined data storage area 54 may be configured to store various predetermined data. For example, the CPU 30 may be configured to receive an e-mail from an external device in accordance with the e-mail communication process, and the CPU 30 may be configured to store the e-mail into the predetermined data storage area 54. A portion of the predetermined data storage area 54 that stores the e-mail may not be released after the e-mail communication process terminates. Thus, the predetermined data storage area 54 may be configured to store various predetermined data to be used by each of the application programs, but the predetermined data storage area 54 may not be released when an application program finishes using the predetermined data storage area 54. The CPU 30 may be configured to release a portion of the predetermined data storage area 54 storing particular data when a user selects the particular data for erasure.

The setting information storage area 56 may be configured to store various setting information for the CPU 30. For example, the setting information storage area 56 may store wireless setting information that may indicate an appropriate wireless communication system to be used by the CPU 30. For example, the setting information storage area 56 may store information indicating the 3G system (e.g., the 3G system may be specified in the wireless communication setting) or information indicating the Wi-Fi® system (e.g., the Wi-Fi® system may be specified in the wireless communication setting) as the wireless setting information, in accordance with a user's instruction (e.g., in accordance with a user's operation through the operating portion 14).

A print data providing process performed by the mobile terminal 10 now is described with reference to FIG. 2. The user may use the operating portion 14 to initiate the web browser application program 44. When the user specifies a uniform resource locator ("URL"), the CPU 30 may obtain webpage data corresponding to the specified URL from the web server 100, in accordance with the web browser application program 44. When the 3G system is specified in the wireless communication setting of the mobile terminal 10, the CPU 30 may obtain the webpage data from the web server 100 using the 3G system and may store the obtained webpage data in the work area 52. When the Wi-Fi® system is specified in the wireless communication setting of the mobile terminal 10, the CPU 30 may obtain the webpage data from the web server 100 using the Wi-Fi® system and may store the obtained webpage data in the work area 52. The CPU 30 may display on the display 12 a webpage represented by the webpage data stored in the work area 52 (hereinafter, "specific webpage data").

The user may use operating portion 12 to instruct the mobile terminal 10 to display a portion of or the entirety of the webpage represented by the webpage data on the display 12.

In FIG. 2, the CPU 30 may perform steps S2 and S4 in accordance with the basic program 42. In step S2, the CPU 30 may determine whether the user has instructed the printing application program 46 through the operating portion 14 to initiate while the display 12 displays the portion or the entirety of the webpage (e.g., a first print instruction). When the CPU 30 makes a positive determination in step S2 (step S2: YES), the CPU 30 may initiate the printing application program 46 (step S4).

After initiating the printing application program 46, the CPU 30 may perform steps S12 to S48, in accordance with the printing application program 46. In step S12, the display control device 64 may determine whether preview data is stored in the predetermined data storage area 54. The storage control device 60 may store the preview data in the predetermined data storage area 54 in step S24 (described below). When preview data is stored in the predetermined data storage area 54 (step S12: YES), the CPU 30 may move to step S16.

When preview data is not stored in the predetermined data storage area 54 (step S12: NO), the display control device 64 may generate preview data based on the specific webpage data (step S14), and the routine may move to step S16. More specifically, the display control device 64 may generate preview image data (e.g., specific image data), which may represent the portion of the webpage displayed on the display 12 when the CPU 30 determines that the user has instructed the printing application program 46 to initiate in step S2. For example, the preview image data may comprise JPEG formatted data. The display control device 64 may generate preview data that may represent a preview image comprising: an image represented by the generated preview image data, a "printing condition specifying" graphic, and a "cancel" graphic. The display control device 64 may store the generated preview data in the work area 52.

In step S16, the display control device 64 may control the display 12 to display a preview image represented by the preview data. When the display control device 64 makes a positive determination in step S12 (step S12: YES), the display control device 64 may control the display 12 to display the preview image represented by the preview data stored in predetermined storage area 54 (step S16). When the display control device 64 makes a negative determination in step S12 (step S12: NO), the display control device 64 may generate preview data in step S14 and subsequently may control the display 12 to display the preview image represented by the preview data stored in the work area 52 (step S16).

In step S18, the CPU 30 may determine whether the user has instructed the mobile terminal 10 through the operating portion 14 to initiate a printing condition specification process while the display 12 displays the preview image. The user may instruct the mobile terminal 10 to initiate a printing condition specification process by selecting the "printing condition specifying" graphic comprised in the preview image. When the CPU 30 detects that the user has selected the "printing condition specifying" graphic, the CPU 30 may make a positive determination (step S18: YES). When the CPU 30 detects that the user has selected the "cancel" graphic comprised in the preview image or that the user has selected an "on-hook" graphic on the operating portion 14, the CPU 30 may make a negative determination (step S18: NO).

When the CPU 30 makes a negative determination in step S18 (step S18: NO), the mobile terminal 10 may terminate the print data providing process. More specifically, the CPU 30 may release the area that stores the preview data used in step S16 (e.g., the area in the work area 52 or the area in the predetermined data storage area 54). The CPU 30 subsequently may terminate the printing application program 46, which may terminate the print data providing process.

When the CPU 30 makes a positive determination in step S18 (step S18: YES), the CPU 30 may determine whether the Wi-Fi® system is specified in the wireless communication setting of the mobile terminal 10 in step S20. When the 3G system is specified in the wireless communication setting of the mobile terminal 10 (step S20: NO), the routine may move to step S22. When the Wi-Fi® system is specified in the wireless communication setting of the mobile terminal 10 (step S20: YES), the CPU 30 may move to step S40.

The process when the CPU 30 makes a negative determination in step S20 (step S20: NO) now is described. In step S22, the display control device 64 may control the display 12 to display information prompting the user to change the wireless communication setting of the mobile terminal 10 from the 3G system to the Wi-Fi® system. In step S24, the storage control device 60 may store the preview data stored in the work area 52 (e.g., the preview data generated in step S14) in the predetermined data storage area 54.

In step S26, the end control device 66 may end the printing application program 46 abruptly, without receiving a termination instruction provided by the user, because it may be necessary to terminate the printing application program 46 in order to change the wireless communication setting of the mobile terminal 10. As described above, the end control device 66 may terminate the printing application program 46 abruptly in step S26. Accordingly, the user may change the wireless communication setting of the mobile terminal 10 from the 3G system to the Wi-Fi® system at an appropriate time.

For example, in some configurations, there may be a need to terminate the web browser application program 44 before changing the wireless communication setting of the mobile terminal 10. In some embodiments, the CPU 30 may not end the web browser application program 44 abruptly, without receiving a termination instruction from the user. Nevertheless, the CPU 30 may terminate the web browser application program 44 after receiving the termination instruction from the user. In certain embodiments, for example, when terminating the printing application program 46 abruptly, the CPU 30 may end the web browser application program 44 abruptly, in accordance with the basic program 42 or another program, without receiving the termination instruction from the user.

The CPU 30 may perform step S100 in accordance with the basic program 42. In step S100, the CPU 30 may determine whether the wireless communication setting of the mobile terminal 10 has been changed from the 3G system to the Wi-Fi® system. When the CPU 30 determines that the user has instructed the mobile terminal 10 through the operating portion 14 to change the wireless communication setting from the 3G system to the Wi-Fi® system, the CPU 30 may store information indicating the Wi-Fi® system in the setting information storage area 56, as a substitute for information indicating the 3G system. Thus, the CPU 30 may change the wireless communication setting from the 3G system to the Wi-Fi® system.

When the CPU 30 determines that the wireless communication setting of the mobile terminal 10 has been changed from the 3G system to the Wi-Fi® system (step S100: YES), the CPU 30 may return to step S4. In step S4, the CPU 30 may re-initiate the printing application program 46. Thus, the CPU 30 may initiate the printing application program 46 abruptly, without receiving an instruction to initiate the printing application program 46 from the user.

In step S12, the display control device 64 may make a positive determination (step S12: YES) because the preview data previously was stored in the predetermined data storage area 54 during step S24. Therefore, the display control device 64 may control the display 12 to display the preview image represented by the preview data stored in the predetermined data storage area 54 (step S16).

The process when the CPU 30 makes a positive determination in step S20 (step S20: YES) now is described. When the CPU 30 determines that the Wi-Fi® system is specified in the wireless communication setting of the mobile terminal 10 (step S20: YES), the display control device 64 may control the display 12 to display a printing condition specifying screen (step S40). More specifically, the display control device 64 may obtain a current printer status from the printer 200 using the Wi-Fi® system. The current status of the printer 200 may comprise, for example, a size of a sheet that may be handled by the printer 200, information indicating colors of printing that the printer 200 may perform (e.g., color or monochrome printing), and default settings of the printer 200 (e.g., sheet size: A4 and color of printing: monochrome). The display control device 64 may control the display 12 to display the printing condition specifying screen on which the user may view and may change the current status of the printer 200 through the operating portion 14.

The user may specify the printing conditions through the operating portion 14. For example, when the printing condition specifying screen displays a plurality of sheet-size options (e.g., A4 and B4) as the sizes of sheets that the printer 200 may handle, the user may specify a desired sheet size from the plurality of sheet-size options. When the printing condition specifying screen displays a plurality of color options (e.g., color and monochrome) as the colors of printing that the printer 200 may perform, the user may specify a desired color of printing from the plurality of color options.

In step S42, the display control device 64 may determine whether the user has indicated through the operating portion 14 that the printing condition specification is complete. The user may indicate that the printing condition specification is complete by selecting an "OK" graphic comprised in the printing condition specifying screen. When the CPU 30 detects the user has selected the "OK" graphic comprised in the printing condition specifying screen, (step S42: YES), the generating device 68 may generate print data (step S44). More specifically, the generating device 68 may generate print data (e.g., data in page description language ("PDL") format), based on the preview image data (e.g., data in JPEG format), which the preview data comprises, and the printing conditions specified between steps S40 and S42. For example, the generating device 68 may perform image processing using the preview image data to generate image data having a length and width suitable for the specified sheet size specified. The generating device 68 may perform image processing using the preview image data, such that the generated image data is suitable for the color of printing specified by the user.

In step S46, the providing device 62 may provide the print data generated in step S44 to the printer 200 using the Wi-Fi® system, which is specified in the wireless communication setting of the mobile terminal 10. When the preview data (e.g., the preview data stored in step S24) is stored in the predetermined data storage area 54 (e.g., when the display control device 64 makes a positive determination in step S12 (step S12: YES)), the storage control device 60 then may release the portion of the predetermined data storage area 54 that stores the preview data (step S48), and the mobile terminal 10 may terminate the print data providing process. When the preview data is not stored in the predetermined data storage area 54 (e.g., when the display control device 64 makes a negative determination in step S12 (step S12: NO)), the mobile terminal 10 then may terminate the print data providing process without performing step S48.

Hereinafter, example Cases A and B are described with reference to FIG. 3.

Case A

In Case A (e.g., the Wi-Fi® system is specified in the wireless communication setting of the mobile terminal 10), the mobile terminal 10 may obtain webpage data from the web server 100 using the Wi-Fi® system. In this case, the mobile terminal 10 may provide print data to the printer 200 using the Wi-Fi® system, without changing the wireless communication setting of the mobile terminal 10. In FIG. 3, steps that the mobile terminal 10 may perform in accordance with the printing application program 46 are depicted on the right side of the line representing the mobile terminal 10. Further, in FIG. 3, steps that the mobile terminal 10 may perform in accordance with one or more of the basic program 42 and the web browser application program 44 are depicted on the left side of the line representing the mobile terminal 10.

In Case A, when the CPU 30 initiates the printing application program 46 (step S4 of FIG. 2) while the display 12 displays a webpage, the display control device 64 may control the display 12 to display a preview image (step S16 of FIG. 2) after a negative determination is made in step S12 of FIG. 2 (step S12: NO) and after the display control device 64 has stored the preview data in the work area 52 in step S14 of FIG. 2. Because the Wi-Fi® system is specified in the wireless communication setting of the mobile terminal 10, the CPU 30 may make a positive determination in step 20 of FIG. 2 (step 20: YES), and it may not be necessary to perform steps S22, S24, S26, and S100. Therefore, in Case A, the storage control device 60 may not perform step S24 of FIG. 2 and may not store the preview data in the predetermined data storage area 54, and the end control device 66 may not perform step S26 of FIG. 2 and may not terminate the printing application program 46 abruptly. Further, the CPU 30 may not erase or overwrite the preview data stored in the work area 52 before providing the printer 200 with the print data.

The generating device 68 may generate print data (step S44 of FIG. 2) based on the specified printing conditions (e.g., the printing conditions specified between steps S40 and S42 of FIG. 2) and the preview data stored in the work area 52. The providing device 62 may provide the print data to the printer 200 using the Wi-Fi® system (step S46 of FIG. 2). With this configuration, the mobile terminal 10 may provide the print data to the printer 200 without changing the wireless communication setting of the mobile terminal 10. Thus, the printer 200 may print an image represented by the print data obtained from the mobile terminal 10 onto a printing medium. Therefore, the user may obtain a desired print result appropriately.

Case B

In Case B (e.g., the 3G system is specified in the wireless communication setting of the mobile terminal 10), the mobile terminal 10 may obtain webpage data from the web server 100 using the 3G system. In this case, the mobile terminal 10 may not provide print data to the printer 200 until the wireless communication setting of the mobile terminal 10 is changed because the printer 200 may not communicate using the 3G system.

In Case B, when the CPU 30 initiates the printing application program 46 (step S4 of FIG. 2) while the display 12 displays a webpage, the display control device 64 may control the display 12 to display a preview image on the display 12 (step S16 of FIG. 2) after a negative determination is made in step S12 of FIG. 2 (step S12: NO). Further, the display control device 64 may control the display 12 to display information prompting the user to change the wireless communication setting (step S22 of FIG. 2). Thus, when the mobile terminal 10 has the above-described configuration, the user may efficiently change the wireless communication setting.

The storage control device 60 may store the preview data in the predetermined data storage area 54 (step S24 of FIG. 2). The end control device 66 may terminate the printing application program 46 abruptly (step S26 of FIG. 2) after the storage control device 60 stores the preview data in the predetermined data storage area 54. Thus, the mobile terminal 10 may maintain the preview data when the end control device 66 terminates the printing application program 46. Thus, the above-described configuration may eliminate a need for the user to provide an instruction to terminate the printing application program 46 through the operating portion 14.

When the CPU 30 determines that the user has changed the wireless communication setting of the mobile terminal 10 from the 3G system to the Wi-Fi® system (step S100: YES in FIG. 2), the CPU 30 may re-initiate the printing application program 46 (step S4 of FIG. 2), and the display control device 64 may control the display 12 to display the preview image (step S16 of FIG. 2) after a positive determination is made in step S12 of FIG. 2 (step S12: YES). Thus, when the mobile terminal 10 has the above-described configuration, the user may confirm an image to be printed before the printer 200 prints the image. In further embodiments, for example, the CPU 30 automatically may change the wireless communication setting of the mobile terminal 10 from the 3G system to the Wi-Fi® system, in accordance with one or more of the basic program 42 and the other programs, when the end control device 66 terminates the printing application program 46. In the further embodiments, in step S22 of FIG. 2, the display control device 64 may control the display 12 to display information indicating that the mobile terminal 10 changes the wireless communication setting automatically, rather than prompting the user to change the wireless communication setting.

After the display control device 64 determines that the user has completed specifying the printing conditions (e.g., sheet size and color of printing) (step S42: YES in FIG. 2), the generating device 68 may generate print data (step S44 of FIG. 2) based on the specified printing conditions and the preview data stored in the predetermined data storage area 54 in step S24. Thus, in the above-described configuration, the generating device 68 may generate print data in accordance with the printing conditions selected by the user. Therefore, the user may obtain a desired print result.

The providing device 62 subsequently may provide the print data to the printer 200 using the Wi-Fi® system (step S46 of FIG. 2). The printer 200 may print using the print data. Generally, when the CPU 30 re-initiates the printing application program 46 after the wireless communication setting changed from a first wireless communication system (e.g., the 3G system) to a second wireless communication system (e.g., the Wi-Fi® system), the providing device 62 may provide the printer 200 with the print data obtained based on image data stored in a predetermined area (e.g., the predetermined data storage area 54) using the second wireless communication system.

When the providing device 62 provides the print data to the printer 200, the storage control device 60 may release the portion of the predetermined data storage area 54 in which the preview data is stored (step S48 of FIG. 2). Thus, in the above-described configuration, exhaustion of the storage area in the predetermined data storage area 54 due to accumulation of preview data therein may be prevented or reduced.

The mobile terminal 10 has been described in detail according to certain embodiments. The above description may correspond to a situation in which the printing application program 46 may be initiated (S4 of FIG. 2) to print a webpage while the display 12 displays the webpage (e.g., a situation in which the mobile terminal 10 may instruct the printer 200 to print the webpage displayed on the display 12). Under these circumstances, the mobile terminal 10 may store preview image data, which may represent the webpage displayed on the display 12, in the predetermined data storage area 54. Consequently, after the CPU 30 changes the wireless communication setting of the mobile terminal 10 from the 3G system to the Wi-Fi® system, the mobile terminal 10 may provide the printer 200 with print data, which may be obtained based on preview image data stored in the predetermined data storage area 54, without re-obtaining webpage data from the web server 100 using the Wi-Fi® system. Thus, the printer 200 may print an image represented by the print data (e.g., a webpage displayed on the display 12 when the printing application program 46 initiates) onto a printing medium, in accordance with the print data received from the mobile terminal 10. Therefore, the user may obtain a desired print result.

For example, the display 12 may display a specific webpage thereon, which is represented by webpage data obtained using the 3G system. The mobile terminal 10 may not allow the printer 200 to print the specific webpage using the 3G system. Therefore, for example, there may be a need to change the wireless communication setting of the mobile terminal 10 from the 3G system to the Wi-Fi® system after webpage application program 44 terminates at least once. Nevertheless, webpage data that may represent the same webpage as the specific webpage may not be obtained again when the web browser application program 44 re-initiates.

For example, when a webpage comprises a map, the map may be scrolled to change a current view. When the map is scrolled, the current view of the map on the webpage may be changed, although the URL of the webpage may not be changed. In this case, the webpage having the same contents may not be displayed, even when the web browser application program 44 is re-initiated and when the webpage data is obtained from the same URL after the wireless communication setting was changed. Therefore, when a user issues an instruction to print an image represented by the webpage data obtained using the 3G system, the image may not be displayed after changing the wireless communication setting from the 3G system to the Wi-Fi® system. In such a system, the mobile terminal 10 may not instruct the printer 200 to print the image desired by the user (e.g., the mobile terminal 10 may not provide the user with an appropriate print result).

According to embodiments described herein, to overcome such a problem, the mobile terminal 10 may store preview image data, which may represent a webpage currently displayed (e.g., the current view of the map displayed when the user issues a print instruction to print the webpage displaying the map), in the predetermined data storage area 54 before the web browser application program 44 terminates. The mobile terminal 10 subsequently may generate print data based on the preview image data stored in the predetermined data storage area 54 and may provide the generated print data to the printer 200 after the CPU 30 changes the wireless communication setting. Accordingly, the mobile terminal 10 may provide the user with a desired print result (e.g., the current view of the map displayed when the user issued the print instruction to print the webpage).

The plurality of wireless communication systems, which are available to the mobile terminal 10 for selective use, may comprise wireless communication systems other than the 3G system and the Wi-Fi® system, such as, for example, a Bluetooth® system (Bluetooth® is a registered trademark owned by BLUETOOTH SIG. INC. of Kirkland, Wash.). For example, the mobile terminal 10 may communicate with the printer 200 using the Bluetooth® system (e.g., the second wireless communication system). The CPU 30 may change the wireless communication setting of the mobile terminal 10 to the Bluetooth® system (e.g., the CPU 30 may store information indicating the Bluetooth® system in the setting information storage area 56).

In above-described embodiments, the CPU 30 may determine whether the user has instructed the printing application program 46 through the operating portion 14 to initiate while the display 12 displays a portion of or an entirety of the webpage (step S2 of FIG. 2). Nevertheless, in certain embodiments, for example, the user may instruct the mobile terminal 10 to hide a specific webpage from the display 12 (e.g., minimization of a window). Thus, the user may instruct the mobile terminal 10 to hide the specific webpage, which the display 12 currently is displaying, even though the web browser application program 44 may be executing. Thereafter, the user may instruct the printing application program 46 to initiate, so that the printer 200 may print the specific webpage. In this case, the instruction to hide the specific webpage may be an example of the first print instruction, and the instruction to initiate the printing application program 46 may be an example of a second print instruction.

In above-described embodiments, the display control device 64 may generate preview data representing a preview image that may comprise: an image represented by preview image data, the "printing condition specifying" graphic, and the "cancel" graphic (step S14 of FIG. 2). Nevertheless, in certain embodiments, for example, the display control device 64 may generate preview data representing a preview image that may comprise a "print" graphic, as well as the image represented by preview image data, the "printing condition specifying" graphic, and the "cancel" graphic. The CPU 30 may make a positive determination in step S18 of FIG. 2 (step S18: YES) when the user selects the "print" graphic. When the CPU 30 makes a positive determination in step S20 of FIG. 2 (step S20: YES) after the user chose the "print" graphic, the CPU 30 may skip step S40 of FIG. 2, make a positive determination in step 42 of FIG. 2, and proceed to step S44 of FIG. 2. Thus, after the user selects the "print" graphic, the display control device 64 may not control the display 12 to display the printing condition specifying screen, and the generating device 68 may generate print data (e.g., data in PDL format) based on default settings obtained from the printer 200 and the preview image data comprised in the preview data.

In above-described embodiments, the CPU 30 may terminate or initiate the printing application program 46 abruptly in some cases, without receiving instructions from the user. Nevertheless, in certain embodiments, for example, the CPU 30 may initiate or terminate the printing application program 46 when the CPU 30 receives an instruction to initiate or terminate the printing application program 46. In this case, the display control device 64 may control the display 12 to display information prompting the user to issue an instruction to initiate the printing application program 46 when, for example, there is a need to initiate the printing application program 46. Further the display control device 64 may control the display 12 to display information prompting the user to issue an instruction to terminate the printing application program 46 when, for example, there is a need to terminate the printing application program 46.

In above-described embodiments, the generating device 68 may generate print data based on preview image data comprised in preview data (step S44 of FIG. 2). Nevertheless, in certain embodiments, for example, the generating device 68 may not generate print data. In this case, the providing device 62 may provide the printer 200 with preview image data (e.g., data in JPEG format) and the printing conditions specified between steps S40 and S42 of FIG. 2. The preview image data may be an example of one or more of the specific image data and the first print data.

In above-described embodiments, the storage control device 60 may release the portion of the predetermined data storage area 54 that stores the preview data (step S48 of FIG. 2) after the providing device 62 provides print data to the printer 200 (step S46 of FIG. 2). Nevertheless, in certain embodiments, for example, when the CPU 30 initiates the printing application program 46 (step S4 of FIG. 2) after the wireless communication setting was changed (step S100: YES in FIG. 2), the storage control device 60 may move the preview data stored in the predetermined data storage area 54 to the work area 52 (e.g., the storage control device 60 may generate additional preview data in the work area 52 based on the preview data stored in the predetermined data storage area 54), and the storage control device 60 may erase the preview data stored in the predetermined data storage area 54 (e.g., the storage control device 60 may release the portion of the predetermined data storage area 54 that stores the preview data). In general, the storage control device 60 may store first specific image data representing a first image in predetermined storage area 54 when the user provides a first print instruction to print the first image while the display 12 displays the first image represented by the first specific data. The mobile terminal 10 may obtain the first specific data from another device (e.g., the web server 100) using a first wireless communication system (e.g., the 3G system), when the first wireless communication system is specified in the wireless communication setting. After the CPU 30 changes the wireless communication setting, the storage control device 60 may maintain the specific image data in the predetermined storage area until the generating device 68 generates image data based on the first specific image data.

In above-described embodiments, the Wi-Fi® system may remain specified in the wireless communication setting of the mobile terminal 10 after the providing device 62 provides the print data to the printer 200 (step S46 of FIG. 2). Nevertheless, in certain embodiments, for example, the display control device 64 may control the display 12 to display information prompting the user to change the wireless communication setting. After the mobile terminal 10 obtains webpage data using the 3G system and the CPU 30 changes the wireless communication setting from the 3G system to the Wi-Fi® system to provide print data to the printer 200 (step S100: YES in FIG. 2), the user may desire to change the wireless communication setting to the 3G system again. Therefore, for example, the display control device 64 may control the display 12 to display information prompting the user to change the wireless communication setting. By doing so, the user quickly may change the wireless communication setting to a desired wireless communication system. The display control device 64 may control the display 12 to display information related to the provision of print data, wherein the information related to the provision of print data comprises one or more of information indicating that the mobile terminal 10 has provided print data to the printer 200 and the information prompting the user to change the wireless communication setting after the mobile terminal 10 has provided print data to the printer 200.

In above-described embodiments, the control portion 20 may comprise two memories 40 and 50. Nevertheless, in certain embodiments, for example, the control portion 20 may comprise one or more of a single memory and a specific storage device, which comprises at least one of a hard disk and a nonvolatile memory, in addition to or instead of the ROM 40 and the RAM 50. In this case, the specific memory (e.g., the one or more of the single memory and the specific storage device) may comprise the predetermined data storage area 54.

In above-described embodiments, each of devices 60, 62, 64, 66, and 68 may be implemented by the CPU 30, which may perform the process steps in accordance with the printing application program 46. Nevertheless, in certain embodiments, one or more of devices 60, 62, 64, 66, and 68 may be implemented by other hardware (e.g., a logic circuit).

The terminal device may comprise one or more terminals that may not be portable or mobile (e.g., desktop personal computers).

While the invention has been described in connection with various example structures and illustrative embodiments, it will be understood by those skilled in the art that other variations and modifications of the structures, configurations, and embodiments described above may be made without departing from the scope of the invention. For example, this application comprises any possible combination of the various elements and features disclosed herein, and the particular elements and features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or practice of the invention disclosed herein. It is intended that the specification and the described examples are illustrative with the true scope of the invention being defined by the following claims.

What is claimed is:

1. A non-transitory, computer-readable storage medium storing a computer program comprising computer-readable instructions executable by a processor of a terminal device configured to perform communication by selectively using one of a plurality of wireless communication systems comprising an ITU communication system and a Wi-Fi communication system, the ITU communication system being a wireless communication system that complies with a standard defined by the International Telecommunication Union, the Wi-Fi communication system being a wireless communication system that complies with a standard defined by the Wi-Fi Alliance, a communication between the terminal device and a server capable of using the ITU communication system, a communication between the terminal device and the server capable of using the Wi-Fi communication system, a communication between terminal device and a printing devise not capable of using the ITU communication system, and a communication between the terminal device and the printing device capable of using the W-Fi communication system, the computer-readable instructions instructing the processor to execute functions comprising:

obtaining image data from the server using either the ITU communication system or the Wi-Fi communication system;

after the image data is obtained from the server using either the ITU communication system or the Wi-Fi communication system, receiving an instruction to start a process for printing an image on the printing device;

in response to receiving the instruction to start the process for printing the image on the printing device, determining which one of the ITU communication system and the Wi-Fi communication system is set in a wireless communication setting of the terminal device for communicating with the printing device;

in response to determining that the ITU communication system is set in the wireless communication setting, performing a predetermined process for changing the wireless communication setting from the ITU communication system to the Wi-Fi communication system;

in response to changing the wireless communication setting from the ITU communication system to the Wi-Fi communication system according to the predetermined process, providing print data, based on the image data, to the printing device using the Wi-Fi communication system; and in response to determining that the W-Fi communication system is set in the wireless communication setting, providing the print data, based on the image data, to the printing device using the Wi-Fi communication system without changing the wireless communication setting.

2. The non-transitory, computer-readable storage medium according to claim 1, wherein the computer-readable instructions instruct the processor to execute functions further comprising:

in response to changing the wireless communication setting from the ITU communication system to the Wi-Fi communication system, generating the print data in accordance with a specified printing condition.

3. The non-transitory, computer-readable storage medium according to claim 1, wherein the predetermined process includes controlling a display of the terminal device to display a notification including a prompt to change the wireless communication setting from the ITU communication system to the Wi-Fi communication system.

4. The non-transitory, computer-readable storage medium according to claim 1, wherein, in response to determining that the ITU communication system is set in the wireless communication setting, the image data comprises first webpage data obtained from the server using the ITU communication system, and wherein, in response to determining that the Wi-Fi communication system is set in the wireless communication setting, the image data comprises second webpage data obtained from the server using the Wi-Fi communication system.

5. The non-transitory, computer-readable storage medium according to claim 1, wherein the ITU communication system is a third generation mobile telecommunications system, and wherein the Wi-Fi communication system is wireless fidelity system.

6. The non-transitory, computer-readable storage medium according to claim 1, the predetermined process includes a process to change the wireless communication setting from the ITU communication system to the Wi-Fi communication system.

7. The non-transitory, computer-readable storage medium according to claim 1, wherein the computer-readable instructions instruct the processor to execute functions further comprising:

in response to receiving the instruction to start the process for printing the image on the printing device, generating specific image data, based on the image data, representing the image; and in response to generating the specific image data, controlling a display of the terminal device to display the image using the generated specific image data;

wherein the print data is generated based on the generated specific image data.

8. The non-transitory, computer-readable storage medium according to claim 7, wherein the computer-readable instructions instruct the processor to execute functions further comprising:

in response to changing the wireless communication setting from the ITU communication system to the Wi-Fi communication system, controlling the display to display again the image previously displayed on the display.

9. The non-transitory, computer-readable storage medium according to claim 7, wherein the computer-readable instructions instruct the processor to execute functions further comprising:

in response to determining that the ITU communication system is set in the wireless communication setting, storing the generated specific image data.

10. The non-transitory, computer-readable storage medium according to claim 7, wherein the computer-readable instructions instruct the processor to execute functions further comprising:

in response to determining that the ITU communication system is set in the wireless communication setting, storing the generated specific image data in a memory comprised in the terminal device.

11. The non-transitory, computer-readable storage medium according to claim 10, wherein the computer-readable instructions instruct the processor to execute functions further comprising:

in response to storing the generated specific image data in the memory, terminating a specific application program, wherein the specific application program comprises the computer-readable instructions that instruct the processor to execute the storing function, the providing function, and the terminating function.

12. The non-transitory, computer-readable storage medium according to claim 10, wherein, in response to determining that the ITU communication system is set in the wireless communication setting, the storing function comprises storing the specific image data in a predetermined storage area of the memory, and wherein the computer-readable instructions instruct the processor to execute functions further comprising:

releasing a specific area of the predetermined storage area after providing the print data to the printing device, wherein the specific area is a portion of the predetermined storage area that stores the specific image data.

13. The non-transitory, computer-readable storage medium according to claim 10, wherein the image is a portion of content that is displayed on the display at a time when the specific image data is generated, wherein another portion of the content is displayed on the display after changing the wireless communication setting from the ITU communication system to the W-Fi communication system, and wherein the computer-readable instructions instruct the processor to execute functions further comprising:

generating the print data, such that the portion of the content that is displayed on the display at the time when the specific image data is generated is an image to be printed, wherein the image to be printed is different from the other portion of the content displayed on the display.

14. The non-transitory, computer-readable storage medium according to claim 10, wherein the computer-readable instructions instruct the processor to execute functions further comprising:

in response to receiving the instruction to start the process for printing the image on the printing device, determining whether the specific image data representing the image is stored in the memory, wherein, in response to determining that the specific image data is not stored in the memory, the generating function comprises generating the specific image data.

15. A terminal device configured to communicate by selectively using one of a plurality of wireless communication systems comprising an ITU communication system and a Wi-Fi communication system, the ITU communication system being a wireless communication system that complies with a standard defined by the International Telecommunication Union, the Wi-Fi communication system being a wireless communication system that complies with a standard defined by the Wi-Fi Alliance, a communication between the terminal device and a server capable of using the ITU communication system, a communication between the terminal device and the server capable of using the Wi-Fi communication system, a communication between the terminal device and a printing device not capable of using the ITU communication system, and a communication between the terminal device and the printing device capable of using the Wi-Fi communication system, the terminal device comprising:

a processor; and a memory configured to store computer-readable instructions therein, the computer-readable instructions instructing the processor to perform functions comprising:

obtaining image data from the server using either the ITU communication system or the Wi-Fi communication system;

after the image data is obtained from the server using either the ITU communication system or the Wi-Fi communication system, receiving an instruction to start a process for printing an image on the printing device;

in response to receiving the instruction to start the process for printing the image on the printing device, determining which one of the ITU communication system and the Wi-Fi communication system is set in a wireless communication setting of the terminal device for communicating with the printing device;

in response to determining that the ITU communication system is set in the wireless communication setting, performing a predetermined process for changing the wireless communication setting from the ITU communication system to the Wi-Fi communication system;

in response to changing the wireless communication setting from the ITU communication system to the Wi-Fi communication system according to the predetermined process, providing print data, based on the image data, to the printing device using the Wi-Fi communication system; and in response to determining that the Wi-Fi communication system is set in the wireless communication setting, providing the print data, based on the image data, to the printing device using the Wi-Fi communication system without changing the wireless communication setting.

16. A method of controlling a terminal device that performs communication by selectively using one of a plurality of wireless communication systems comprising an ITU communication system and a Wi-Fi communication system, the ITU communication system being a wireless communication system that complies with a standard defined by the International Telecommunication Union, the Wi-Fi communication system being a wireless communication system that complies with a standard defined by the Wi-Fi Alliance, a communication between the terminal device and a server capable of using the ITU communication system, a communication between the terminal device and the server capable of using the Wi-Fi communication system, a communication between the terminal device and a printing device not capable of using the ITU communication system, a communication between the terminal device and the printing device capable of using the Wi-Fi communication system, the method comprising:

obtaining image data from the server using either the ITU communication system or the Wi-Fi communication system;

after the image data is obtained from the server using either the ITU communication system or the server using the Wi-Fi communication system, receiving an instruction to start a process for printing an image on the printing device;

in response to receiving the instruction to start the process for printing the image on the printing device, determining which one of the ITU communication system and the Wi-Fi communication system is set in a wireless communication setting of the terminal device for communicating with the printing device;

in response to determining that the ITU communication system is set in the wireless communication setting, performing a predetermined process for changing the wireless communication setting from the ITU communication system to the Wi-Fi communication system;

in response to changing the wireless communication setting from the ITU communication system to the Wi-Fi communication system according to the predetermined process, providing print data, based on the image data, to the printing device using the Wi-Fi communication system; and in response to determining that the Wi-Fi communication system is set in the wireless communication setting, providing the print data, based on the image data, to the printing device using the Wi-Fi communication system without changing the wireless communication setting.

* * * * *